United States Patent [19]

Quarmby et al.

[11] Patent Number: 5,467,010

[45] Date of Patent: Nov. 14, 1995

[54] VOLTAGE REGULATOR CONTROL CIRCUIT

[75] Inventors: Neil A. Quarmby; David W. Eddowes, both of Bedford, England

[73] Assignee: Texas Instruments Incorporated, Dallas, Tex.

[21] Appl. No.: 991,884

[22] Filed: Dec. 17, 1992

[30]    Foreign Application Priority Data

Dec. 18, 1991 [GB]  United Kingdom ............... 9126789

[51] Int. Cl.⁶ ................................................. H02M 3/06
[52] U.S. Cl. ............................ 323/284; 323/222; 323/288
[58] Field of Search ................................. 323/222, 272, 323/282, 284, 351, 288

[56]          References Cited

U.S. PATENT DOCUMENTS

4,622,511  11/1986  Moore ............................... 323/272
4,794,333  12/1988  Milkovic .......................... 324/142

*Primary Examiner*—Peter S. Wong
*Assistant Examiner*—Shawn Riley
*Attorney, Agent, or Firm*—William E. Hiller; Richard L. Donaldson

[57]            ABSTRACT

Voltage regulator control circuit relying upon differential voltage translation and filtering using switched capacitor networks. The voltage regulator control circuit includes a reference input port for receiving an input reference voltage, a controlled-voltage input port for receiving an output voltage from a voltage regulator to be controlled, a capacitor network, a control signal generator, and a switching network for providing controllable connections between capacitors of the capacitor network, the reference input port, the controlled-voltage input port, and the control signal generator. The switching network is operable to alter the controllable connections in a repeating sequence so as to provide an output control signal from the control signal generator which is a measure of the difference between the input reference voltage and the controlled voltage.

12 Claims, 4 Drawing Sheets

VOLTAGE REGULATOR CONTROL CIRCUIT

The present invention relates to a voltage regulator control circuit.

A voltage regulator includes a control circuit and output voltage regulating means. In operation, the voltage regulator control circuit drives the output voltage regulating means, and the output voltage regulating means provides the output voltage from the regulator. The voltage regulator control circuit, in operation, compares either the output voltage or a proportion of the output voltage with a constant reference signal and so drives the output voltage regulating means as to hold the output voltage at a level that makes the two voltages being compared substantially equal.

There are several shortcomings of known voltage regulator control circuits, and it is an object of the present invention to reduce at least some of those shortcomings.

The invention provides a voltage regulator control circuit which includes a capacitor network, a control signal generating means, a reference input port for receiving an input reference voltage, a controlled-voltage input port for receiving an output voltage from a voltage regulator which is controlled by the voltage regulator control circuit, and a switching network which provides controllable connections among the capacitors of the capacitor network, the reference input port, the controlled-voltage input port and the control signal generating means, the switching network being operable to alter the controllable connections in a repeating sequence in order to provide, as an output from the control signal generating means, an output control signal which is a measure of the difference between the input reference voltage and the controlled voltage.

In a first example of the voltage regulator control circuit preferably, the capacitor network includes a node common to all of the capacitors of the network, the switching network includes a controllable connection between an input port of the control signal generating means and the node which is common to all of the capacitors of the network, and, in the operation of the voltage regulator control circuit, a charge which is dependent on the difference between the input reference voltage and the controlled voltage is supplied by the capacitor network to the control signal generating means through the node which is common to the capacitors of the capacitor network.

In the first example of the voltage regulator control circuit, preferably, the control signal generating means is capable of accumulating the charge which it receives from the capacitor network and, preferably, the capacitor network includes three capacitors.

In a second example of the voltage regulator control circuit, preferably, the capacitor network includes a sampling capacitor, the switching network is operable to connect the sampling capacitor to the controlled-voltage input port in order to provide a measure of the controlled output voltage, and the switching network is further operable to isolate the sampling capacitor from the controlled-voltage input port and to connect the sampling capacitor to a control input port of the control signal generating means.

A voltage regulator control circuit in accordance with the invention, is able to compare the output voltage sample with a constant reference voltage that has any selected datum as its reference. For example, the comparison can be performed with a constant reference voltage derived from a voltage supply of opposite polarity to the output voltage of the regulator and with respect to one of the terminals of the negative input supply; the result of the comparison is always valid since that negative input supply is present before the voltage regulator starts to operate. In known systems, the reference voltage is derived from the output voltage which takes some time to establish itself. The disadvantage in known systems is that the result of the comparison is invalid at start-up.

Another shortcoming of known regulator control circuits arises through their use of a d.c. voltage shifting network for translating a signal obtained from the output voltage to a level at which comparison with a reference voltage is possible; that arrangement gives rise to errors in the measured output voltage. In contrast, the control circuit of the present invention avoids any d.c. shifting.

Preferably, the second example of the voltage regulator control circuit includes a control input capacitor connected to the control input port of the control signal generating means, for removing a proportion of the stored charge from the sampling capacitor, in order to control the ratio of the controlled output voltage to the voltage obtained from the sampling capacitor. The use of capacitors for providing a proportion of the output voltage contrasts with known regulator control circuits, which employ resistor networks. The difference is significant in the fabrication of the control circuits as monolithic semiconductor integrated circuits.

Preferably, the second example of the voltage regulator control circuit includes at least one intermediate capacitor connected in the switching network which is operable to connect the or each intermediate capacitor to the sampling capacitor and to the control input port of the control signal generating means. The inclusion of intermediate capacitor storage results in the sampling capacitor sharing its stored energy with the or each intermediate capacitor and effects control of the ratio of the output voltage to the voltage obtained from the sampling capacitor.

Preferably, both examples of the voltage regulator control circuit include a switched capacitor filter network connected to the control signal generating means for controlling the gain of the control loop. The provision of the switched capacitor filter network ensures that the gain of the control loop is adjustable in order to maintain loop stability.

The use of a switched capacitor filter network contrasts with the known arrangements for regulator control circuit filters, which require high value resistors. Those high value resistors are not readily fabricated as components of a semiconductor integrated circuit, whereas the capacitors and switches of the present arrangement can readily be so fabricated.

Preferably, in both examples of the voltage regulator control circuit, the control signal generating means includes a pulse generator which, in operation, provides drive pulses to the switching network and output pulses for driving output voltage regulating means of the voltage regulator.

The control signal generating means may be connected to operate from an input voltage supply that is of the opposite polarity to the output voltage provided by the voltage regulator which is controlled by the control circuit, the input reference voltage being obtained from means connected to the input voltage supply.

The use of capacitors for sampling and scaling the output voltage provides an arrangement which can be readily fabricated as components of a semiconductor integrated circuit. The scaling factor depends on the ratios of the capacitances used, and integrated circuit capacitors with specific capacitance ratios can be made accurately.

A multiple output voltage regulator control circuit, for controlling a voltage regulator which is capable of providing a plurality of controlled output voltages on respective output ports, includes a voltage regulator control circuit as defined above for each controlled output voltage.

Preferably, each switch element of the switching network is a complementary MOSFET. That arrangement provides a switch comprising complementary components which generate opposing thermal voltages that affect the state of charge of the capacitor network.

Advantageously, the voltage regulator control circuit is fabricated as a monolithic integrated circuit, and, preferably, the multiple output voltage regulator control circuit is fabricated as a monolithic integrated circuit.

Three examples of voltage regulator control circuit in accordance with the invention will now be described, by way of example only, with reference to the accompanying drawings, in which.

Figure 1:
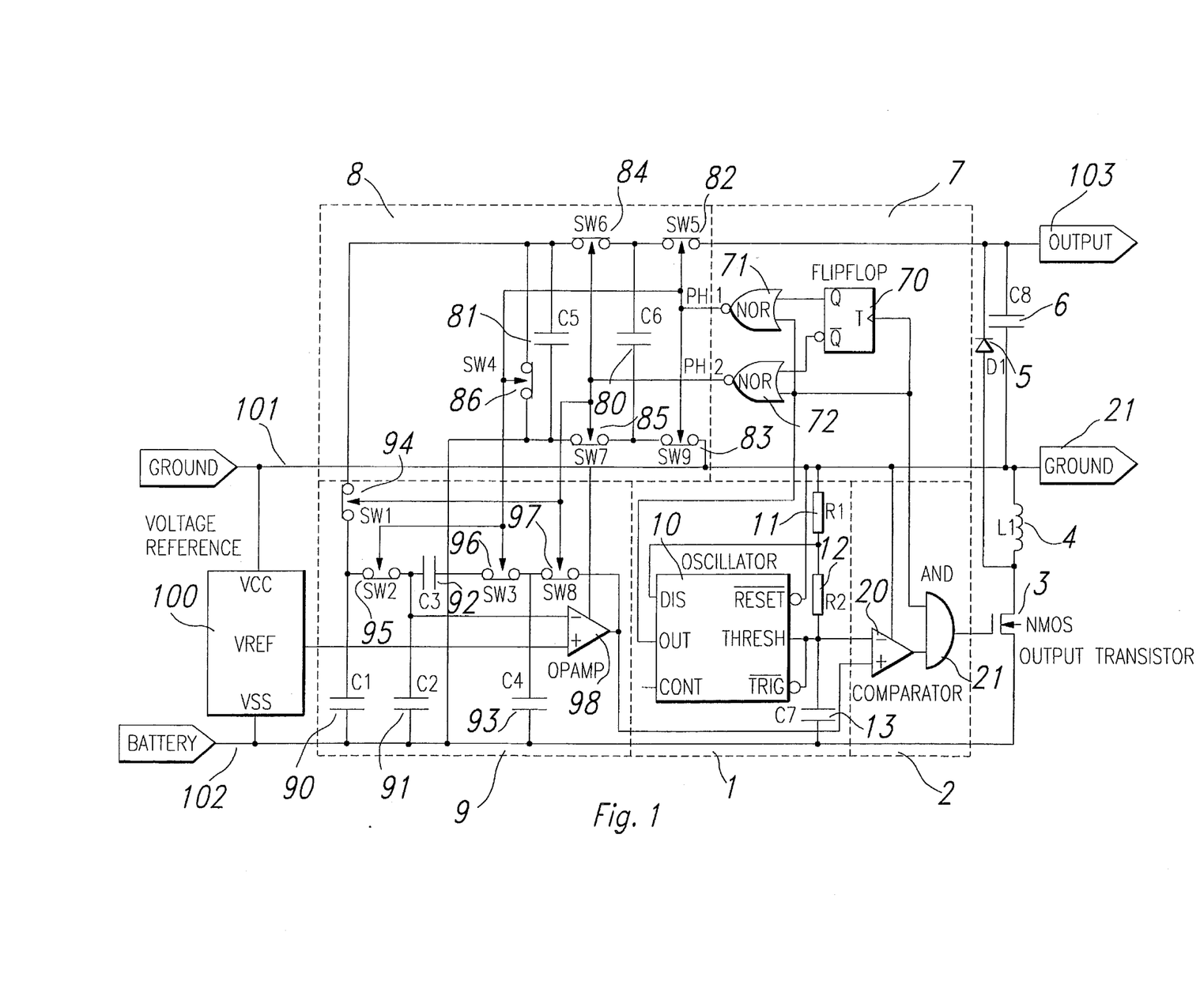
FIG. 1 is a diagram of a voltage regulator including a first example of a single-output voltage regulator control circuit.

Referring to FIG. 1 of the accompanying drawings, the voltage regulator includes a control generator 1, a pulse width modulator 2, an insulated gate transistor 3, an inductor 4, a diode 5, a storage capacitor 6, a switch controller 7, a sampling stage 8, a translation stage 9, voltage reference element 100, supply terminals 101 and 102, and output terminals 101 and 103.

The control generator 1 includes a control oscillator 10, resistors 11 and 12, and a timing capacitor 13. The resistors 11 and 12, and the timing capacitor 13, are connected in series between the supply terminals 101 and 102. The capacitor 13 has one of its terminals connected to the supply terminal 102 and the other of its terminals connected to the resistor 12. The resistors 11 and 12, and the capacitor 13, are so connected to the control oscillator 10 as to act as a timing network for the control oscillator 10. The timing oscillator 10 operates to provide a ramp waveform output and a rectangular waveform output. The rectangular waveform is at a first of its two levels during the rising part of the ramp waveform and is at the other of its two levels during the falling part of the ramp waveform.

The pulse width modulator 2 includes a comparator 20 and a two-input AND gate 21. One input terminal of the AND gate 21 is connected to the output of the comparator 20.

The switch controller 7 includes a bistable flip-flop 70, a first two-input NOR gate 71 and a second two-input NOR gate 72. The Q output of the flip-flop 70 is connected to one input of the NOR gate 71 and the Q output of the flip-flop 70 is connected to one input of the NOR gate 72.

The sampling stage 8 includes a first capacitor 80, a second capacitor 81, switch elements 82,83 and 86 belonging to a first switch network, and switch elements 84 and 85 belonging to a second switch network. The switch elements are complementary MOSFETS. Each switch element has two transfer terminals and a control terminal, and the voltage applied to the control terminal determines whether the transfer terminals are connected to, or disconnected from, each other. One terminal of the first capacitor 80 is connected to one transfer terminal of the switch element 82 and to a transfer terminal of the switch element 84. The other terminal of the first capacitor 80 is connected to one transfer terminal of the switch element 83 and to a transfer terminal of the switch element 85. One terminal of the second capacitor 81 is connected to the other transfer terminal of the switch element 84, to one transfer terminal of the switch element 86 and to one transfer terminal of the switch element 94. The other terminal of the second capacitor 81 is connected to the other transfer terminal of the switch element 85 and to the other transfer terminal of the switch element 86. The other transfer terminal of the switch element 82 is connected to the terminal 103 and the other transfer terminal of the switch element 83 is connected to the terminal 101.

The translation stage 9 includes a third capacitor 90, a fourth capacitor 91, a fifth capacitor 92, a sixth capacitor 93, switch elements 95 and 96 belonging to the first switch network, switch elements 94 and 97 belonging to the second switch network, and an amplifier 98. One terminal of the third capacitor 90 is connected to the other transfer terminal of the switch element 94 and to a transfer terminal of the switch element 95. The other terminal of the third capacitor 90 is connected to one terminal of the fourth capacitor 91, to one terminal of the sixth capacitor 93 and to the terminal 102. The other terminal of the fourth capacitor 91 is connected to the other transfer port of the switch element 95, to one terminal of the fifth capacitor 92 and to the inverting input terminal of the amplifier 98. The other terminal of the fifth capacitor 92 is connected to one transfer terminal of the switch element 96. The other terminal of the sixth capacitor 93 is connected to the other transfer terminal of the switch element 96 and to one transfer terminal of the switch element 97. The other transfer terminal of the switch element 97 is connected to the output terminal of the amplifier 98.

The supply power input terminals 101 and 102 of the voltage regulator are for receiving d.c. input power, which makes the input terminal 102 negative relative to the input terminals 101, and the switch mode voltage regulator provides an output voltage that makes the terminal 103 positive relative to the terminal 101.

The operation of the voltage regulator is as follows:

The control generator 2 supplies a rectangular waveform output, which is applied to one input terminal of each of the NOR gates 71 and 72 and to the toggle (T) input terminal of the bistable flip-flop 70. The NOR gates 71 and 72 provide alternate non-overlapping pulses PH1 and PH2. The pulse PH1 switches on the switch elements 82,83,86,95 and 96 when it is at its high level and the pulse PH2 switches on the switch elements 84,85, 94 and 97 when it is at its high level.

When the switch elements 82, 83, 86, 95 and 96 are conductive, the switch elements 84, 85, 94 and 97 are non-conductive, with the result that the capacitor 80 is connected only to the terminals 101 and 103, and is charged to the output voltage of the power supply; at the same time, the switch 86 shunts the capacitor 81 and discharges it. Charge on the capacitor 90 is shared with the capacitors 91, 92 and 93 because the switch elements 95 and 96 are conductive and the resulting common voltage of the capacitors 90 and 91 is applied to the inverting input terminal of the comparator 98.

When the switch elements 84, 85, 94 and 97 are conductive, the switch elements 82, 83, 86, 95 and 96 are non-conductive, with the result that the capacitor 80 is disconnected from the terminals 101 and 102 and is connected in parallel with the capacitors 81 and 90. The datum voltage of the capacitors 80,81 and 90 is the terminal 102; the original datum voltage of the capacitor 80 was the terminal 101.

The charge accumulated on the capacitor 80 when the switch elements 82 and 83 are conductive amounts to $C_{80}.V_{out}$, where $C_{80}$ is the capacitance of the capacitor 80 and $V_{out}$ is the output voltage, that is, the voltage between the terminals 101 and 103. When the capacitor 80 is connected in parallel with the capacitors 81 and 90, the charge $C_{80}.V_{out}$ is shared among the three capacitors and gives rise to a common voltage $V_{com}$ such that $V_{com}=V_{out}.C_{80}/(C_{80}+C_{81}+C_{90})$. Thus, the voltage $V_{out}$ has been scaled down by a factor $C_{80}/(C_{80}+C_{81}+C_{90})$, which is substantially equal to $C_{80}/(C_{80}+C_{81})$ since $C_{80}$ and $C_{90}$ are much greater than $C_{90}$, where $C_{81}$ and $C_{90}$ are the capacitances of the capacitors 81 and 90, respectively, and the scaled voltage now has the terminal 102 as its datum. The charge stored on the capacitor 90 is $V_{com}.C_{90}$ and that charge is shared with the capacitors 91, 92 and 93 on the next occasion that the switch elements 95 and 96 are conductive, that being the next occasion on which PH1 is at its high value. The capacitor 93 also shares its charge with the capacitors 90,91 and 92. The voltage resulting from the sharing of the charges held by the capacitors 90 and 93 is applied to the inverting input terminal of the amplifier 98, which amplifies the difference between the voltage provided by the capacitors 90 and 91 and the voltage applied to the non-inverting input terminal of the amplifier 98 from the voltage reference element 100. That output voltage of the amplifier 98 is sampled and held by the capacitor 93 on the next occasion that the switch element 97 is conductive and the switch element 96 is non-conductive.

The output voltage from the amplifier 98 represents the difference between a proportion of the output voltage present between the terminals 101 and 103 and the reference voltage from the reference element 100. The output voltage from the amplifier 98 is scaled down by the capacitors 80,81,91 and 92 which have substantially greater capacitances than the capacitors 90 and 93. The capacitors 90 and 93, which have relatively low capacitances, act as high value resistors with effective resistances determined by their capacitances and the operating frequency of the switch elements. The capacitors 90,91,92 and 93 act as a filter network in which the smaller switched capacitors act, in effect, as resistors having high resistances.

The output voltage from the amplifier 98 is applied to the non-inverting input terminal of the comparator 20 which provides a width-modulated rectangular waveform output voltage, in known manner, for controlling the lengths of the conductive periods of the transistor 3.

The switch elements are operated in two groups. Each group is driven by a single clock pulse and the two clock pulses are complementary and non-overlapping.

The voltage regulator control circuit consists of the components shown within the dotted lines in the accompanying drawing, that is, the control generator 1, the pulse width modulator 2, the switch controller 7, the sampling stage 8, and the translation stage 9.

The voltage regulator control circuit employs differential voltage translation of the output voltage from the voltage regulator, available at the storage capacitor 6, using the switched capacitor network included in the switch controller 7, the sampling stage 8 and the translation stage 9. The switched-capacitor network takes a differential sample of the output voltage by isolating both terminals of the sampling capacitor 80 once the sample has been obtained, scales down the sample by charge sharing among the capacitors 80, 81, 90 and 91, and effects the transfer of the scaled down sample in the transfer of a fixed proportion of the charge originally held by the capacitor 80 to the capacitor 91. The charge transferred to the capacitor 91 is compared with the reference voltage from the reference 100 which is obtained from the input voltage and the difference is amplified by the amplifier 98 and passed to a switched-capacitor filter network (switches 96 and 97, capacitors 92 and 93) which is connected to the amplifier 98. The switched-capacitor filter networks controls the gain of the control loop and is effective to ensure its stability. The switched-capacitor filter network includes only small capacitors and performs functions carried out by very large resistors in conventional active filter networks. The functions of sampling and scaling are performed as a single operation; the sampling is differential voltage sampling and the scaling is accurate and reproducible when the capacitors are fabricated in a semiconductor integrated circuit because capacitors fabricated by semiconductor fabrication processes can be closely matched in value.

Figure 2:
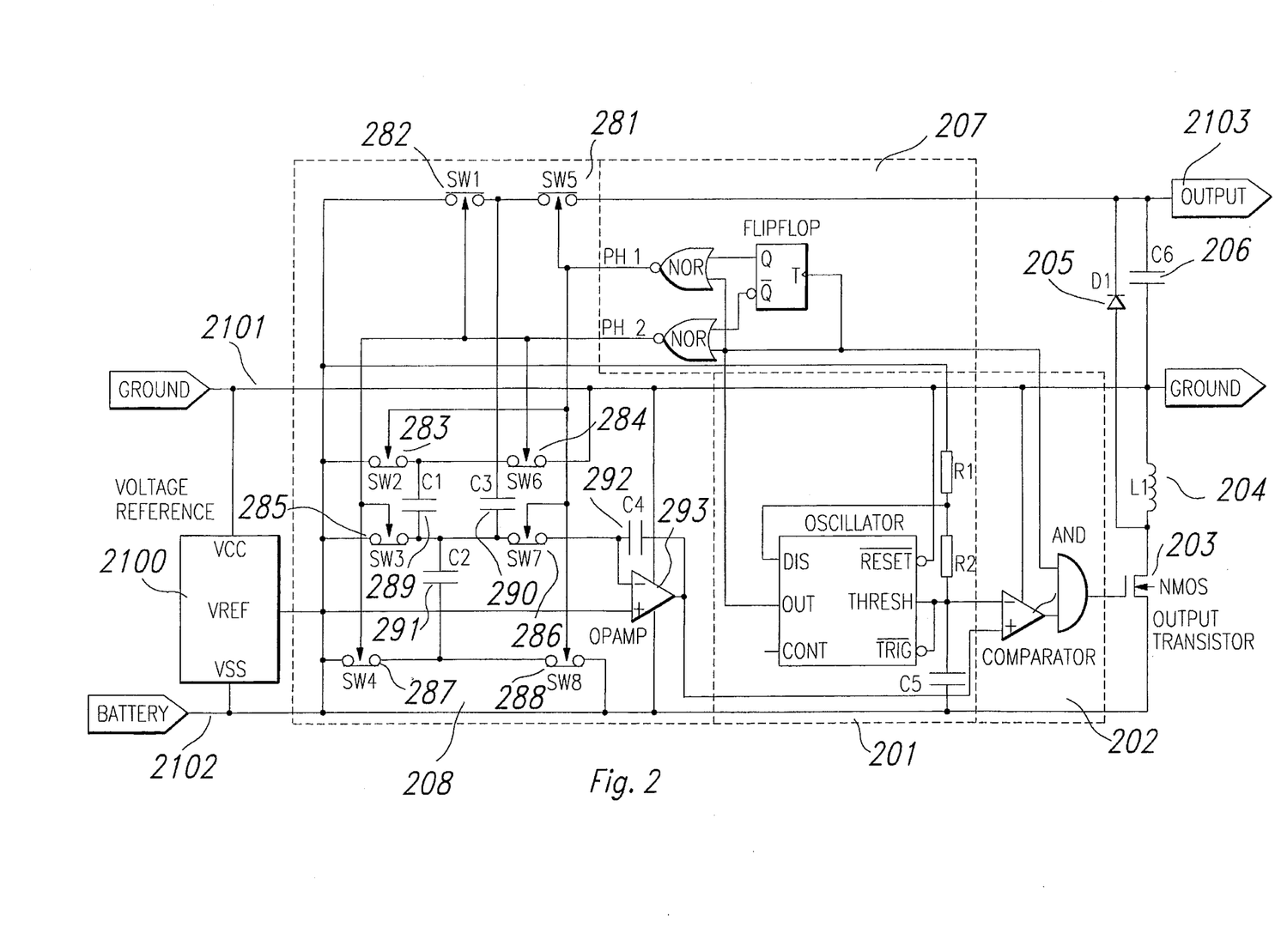
FIG. 2 is a diagram of a voltage regulator including a second example of a single output voltage regulator control circuit and FIGS. 3a and 3b provide a composite diagram of a voltage regulator including a multiple-output voltage regulator control circuit.

Referring to FIG. 2 of the accompanying drawings, the voltage regulator includes a control generator 201, a pulse width modulator, 202, an insulated gate transistor 203, an inductor 204, a diode 205, a storage capacitor 206, a switch controller 207, a combined sampling and translation stage 208, a voltage reference element 2100, supply terminals 2101 and 2102, and output terminals 2101 and 2103.

The voltage regulator represented by FIG. 2 is subtantially the same as that represented by FIG. 1 except that in FIG. 2, the combined sampling and translation stage 208 takes the place of the sampling stage 8 and the translation stage 9 of FIG. 1.

The combined sampling and translation stage 208 includes a first set of switch elements 281, 283, 286, and 288 having their control terminals connected together, and a second set of switch elements 282, 284, 285, and 287 having their control terminal connected together. The control terminals of the first set of switch elements are connected to a first output terminal of the switch controller 207 and that first output terminal provides a first switching pulse PH1. The control terminal of the second set of switch elements are connected to receive a second switching pulse PH2 from the switch controller 207. The pulses PH1 and PH2 do not overlap each other. The combined sampling and translation stage 208 also includes capacitors 289, 290, 291 and 292, and an amplifier 293. One terminal of the capacitor 289 is connected to a transfer terminal of the switch element 283 and to a transfer terminal of the switch element 284. The other terminal of the capacitor 289 is connected to a transfer terminal of the switch element 285, to a transfer terminal of the switch element 286, to one terminal of the capacitor 290 and to one terminal of the capacitor 291. The other terminal of the capacitor 290 is connected to one transfer terminal of the switch element 281 and to one terminal of the switch element 282. The other terminal of the capacitor 291 is connected to one transfer terminal of the switch element 287 and to one transfer terminal of the switch element 288. The capacitor 292 is connected between the output terminal and the inverting input terminal of the amplifier 293, and the inverting input terminal of the amplifier 293 is connected to the other transfer terminal of the switch element 286. The non-inverting input terminal of the amplifier 293 is connected to the reference output terminal of the voltage reference element 2100. The output terminal of the amplifier 293 is connected to the pulse width modulator 202. The other transfer terminal of each of the switch elements 282, 283, 285 and 286 is connected to the reference output terminal of the voltage reference element 2100, the other transfer terminal of the switch element 281 is connected to the output terminal 2103, the other transfer terminal of the switch element 284 is connected to the terminal 2101, and the other transfer terminal of the switch element 288 is connected to the terminal 2102. The switch elements are complementary MOSFETS.

The combined sampling and translation stage 208 has a first configuration when the switching pulse PH2 is at its high level (at which time the switching pulse PH1 is at its low level). In the first configuration of the combined sampling and translation stage 208, the switch elements 282, 284, 285 and 287 are conductive. The switching pulse PH1 is at its low level and the switch elements 281, 283, 286 and 288 are non-conductive. The capacitor 290 is discharged by the conductive switch elements 282 and 285, and the capacitor 291 is discharged by the conductive switch elements 285 and 287. During that time, the capacitor 289 is connected between the terminal 2101 and the reference output terminal of the voltage reference element 2100 by the conductive switches 284 and 285, and charged to the reference voltage.

The combined sampling and translation stage 208 has a second configuration when the switching pulse PH1 is at its high level (at which time the switching pulse PH2 is at its low level). In the second configuration of the combined sampling and translation stage 208, the switch elements 281, 283, 286 and 288 are conductive and the other switch elements are non-conductive. During that time, the inverting input terminal of the amplifier 293 is connected by way of the switch element 286 to that terminal of the capacitor 289 which is connected to a terminal of the capacitor 290 and to a terminal of the capacitor 291. The capacitor 289 is now connected between the inverting terminal of the amplifier 293 and the reference output terminal of the voltage reference element 2100 (which provides a voltage $V_{REF}$) by the switch element 283, the capacitor 290 is now connected between the inverting input terminal of the amplifier 293 and the output terminal 2103 (which provides a voltage $V_{OUT}$) by the switch element 281, and the capacitor 291 is now connected between the inverting input terminal of the amplifier 293 and the terminal 2102 (which provides a voltage $V_{BATT}$) by the switch element 288. The capacitor 292 is connected directly between the output terminal and the inverting terminal of the amplifier 293; also the non-inverting terminal of the amplifier 293 is connected directly to the reference output terminal of the voltage reference element 2100 and, therefore, is held at $V_{REF}$.

The capacitors 290 and 291 are held discharged during the pulse PH2 and the capacitor 289 is charged to the voltage $V_{REF}$. During the pulse PH1, current flows in the capacitor network and the average current $I_{AV}$, due to the capacitors 289, 290 and 291, at the inverting terminal of the amplifier 293 may be expressed as:

$$I_{AV} = \frac{1}{T} [V_1 \times C_{289} - V_2 \times C_{291} + V_3 \times C_{290}]$$

where
T is the duration of the pulse PH1,
$V_1$, $V_2$ and $V_3$ are, respectively, the output voltage, the ground voltage and the battery voltage relative to the reference voltage $V_{REF}$ and
$C_{289}$, $C_{290}$ and $C_{291}$ are the respective capacitances of the capacitors 289, 290 and 291.

In FIG. 2, the capacitances $C_{289}$ and $C_{291}$ are equal to each other and the expression for $I_{AV}$ becomes $$I_{AV} = \frac{1}{T} [(V_1 - V_2) C_{289} + V_3 \times C_{290}]$$

which may be expressed as:

$$I_{AV} \cdot T = [V_{out} \times C_{289} - V_{REF} \times C_{290}]$$

where $V_{OUT}$ is the output voltage with respect to ground, $V_{REF}$ is the reference voltage with respect to the battery voltage.

The charge $I_{AV} \cdot T$ may be expected to provide an output voltage $V_{INT}$ from the amplifier 293 and the capacitor 292 which may be expressed as follows:

$$V_{CONT} = \frac{I_{AV} \cdot T}{C_{292}} = V_{OUT} \times \frac{C_{289}}{C_{292}} - V_{REF} \times \frac{C_{290}}{C_{292}}$$

where $C_{292}$ is the value of the capacitor 292.

The voltage $V_{CONT}$ represents the difference between the proportion $C_{289}/C_{292}$ of the output voltage $V_{OUT}$ and the proportion $C_{290}/C_{292}$ of the reference voltage $V_{REF}$.

The expression for $V_{CONT}$ becomes $$V_{CONT} = V_{OUT} \times \frac{C_{289}}{C_{292}} - V_{REF} \text{ when } C_{290} = C_{292}.$$

The output voltage from the amplifier 293 is applied to the ramp generator 201 and controls the output voltage $V_{OUT}$.

A switched-capacitor filter network can be included between the amplifier 293 and the pulse width modulator stage 202 as a means of controlling the loop gain of the system.

Figure 3A:
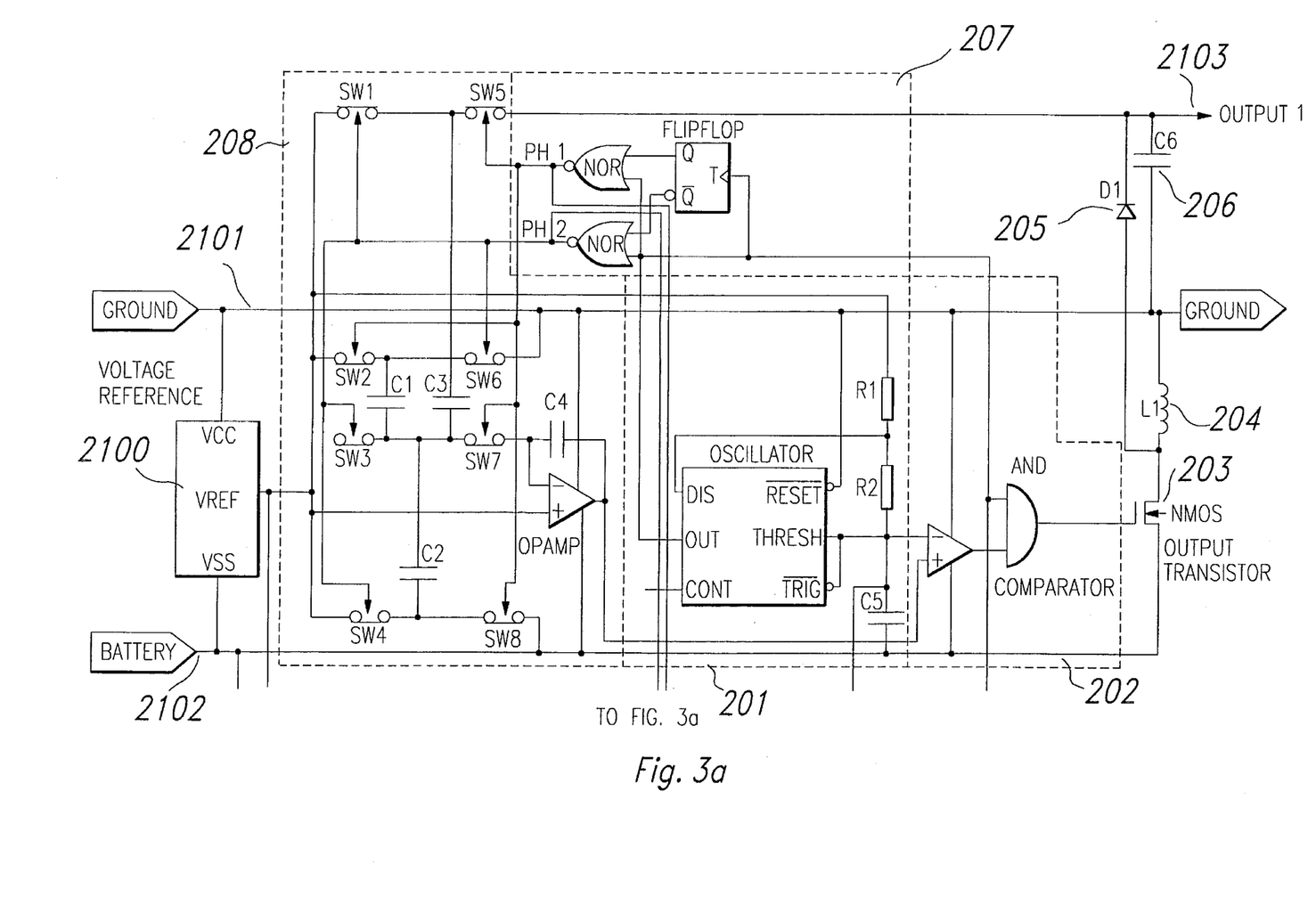
Figure 3B:
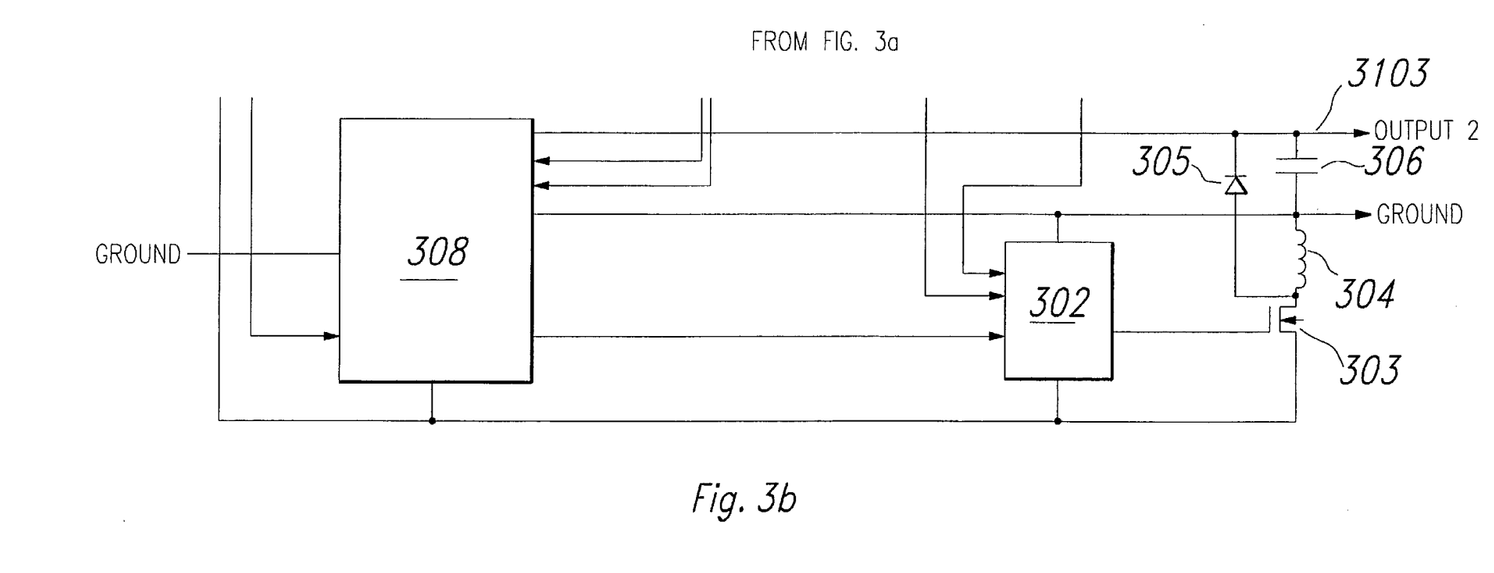

Referring to FIGS. 3a and 3b of the accompanying drawings, the voltage regulator includes all of the second form of voltage regulator control circuit (FIG. 3a) and, also, an additional sampling and translation stage 308, and an additional pulse width modulator 302 (FIG. 3b). The voltage regulator includes, also, the output components of the voltage regulator shown in FIG. 2, and an additional set of output components 303, 304, 305 and 306, which provide a second output voltage on a second output terminal 3103 (FIG. 3b).

The additional sampling and translation stage 308 receives the switching pulses PH1 and PH2 provided by the switch controller 207 and is connected to the reference voltage terminal of the reference element 2100. The additional pulse width modulator 302 receives the ramp output and drive pulse from the control generator 201 and supplies width-modulated drive pulses to the transitor 303. The values of the capacitors of the additional sampling and translation stage 308 differ from the values of the respective capacitors in the sampling and translation stage 208, with the result that the second output voltage available at the terminal 3103 differs from the output voltage available at the terminal 2103. Apart from the differences in the values of their capacitors, the sampling and translation stages 208 and 308 are identical. The pulse width modulators 202 and 302 are also identical.

The number of output terminals can be increased above the two shown in FIGS. 3a and 3b by the addition of further sampling and translation stages and pulse width modulators, connected to further output components and to the sampling and translation stage 208, the control generator 201, and to the voltage reference element 2100 as shown in FIG. 3a. The output voltages need not all be different since it may be desirable, in some circumstances, to have the same voltage available at more than one output terminal, for example, where a single output cannot supply the current required or it is desirable to reduce cross-talk between parts of a system requiring only one supply voltage.

The third voltage regulator control circuit consists of the components 201, 202, 207, 208, 2100, 302 and 308.

A plurality of output voltages are obtainable from the voltage regulator using the third voltage regulator control circuit, shown in FIGS. 3*a* and 3*b*, using a single voltage reference element 2100. That arrangement has the desirable feature, in integrated circuit forms of the voltage regulator control circuit, there is only one reference element to be trimmed.

The voltage regulator control circuits described above all have the desirable feature that, in integrated circuit form, the switch elements and capacitors require relatively small amounts of semiconductor material.

We claim:

1. A voltage regulator control circuit for controlling an output voltage from a voltage regulator comprising:

a controlled-voltage input port for receiving an output voltage from a voltage regulator which is to be controlled by the voltage regulator control circuit;

a reference input port for receiving an input reference voltage;

a control signal generating means;

a capacitor network including a plurality of capacitors;

a switching network interposed between the capacitors of said capacitor network and each of said controlled-voltage input port, said reference input port and said control signal generating means and providing controllable connections among the capacitors of said capacitor network with said controlled-voltage input port, said reference input port, and said control signal generating means; and means controlling the operation of said switching network to alter the controllable connections of said switching network in a repeating sequence;

said control signal generating means being responsive to the repeating sequence of the controllable connections of said switching network to produce an output control signal which is a measure of the difference between the input reference voltage and the controlled voltage.

2. A voltage regulator control circuit as claimed in claim 1, wherein the capacitor network includes three capacitors.

3. A voltage regulator control circuit as set forth in claim 1, wherein said capacitor network further includes a node common to all of the capacitors of the capacitor network;

said switching network including a controllable connection between an input port of said control signal generating means and said node common to all of the capacitors of said capacitor network; and said capacitor network providing a charge to said control signal generating means via said node common to all of the capacitors of said capacitor network in the operation of the voltage regulator control circuit, the charge being dependent upon the difference between the input reference voltage and the controlled voltage.

4. A voltage regulator control circuit as claimed in claim 3, wherein the control signal generating means is capable of accumulating the charge which it receives from the capacitor network.

5. A voltage regulator control circuit as set forth in claim 1, wherein said capacitor network further includes a sampling capacitor;

said switching network including a controllable connection to connect said sampling capacitor to said controlled-voltage input port for providing a measure of the controlled output voltage in said sampling capacitor; and said switching network being operated by said switching network control means for disconnecting the controllable connection between said sampling capacitor and said controlled-voltage input port and for connecting said sampling capacitor via a controllable connection to a control input port of said control signal generating means, thereby isolating said sampling capacitor from the controlled-voltage input port.

6. A voltage regulator control circuit as set forth in claim 5, wherein said capacitor network further includes a control input capacitor connected to the control input port of said control signal generating means for removing a proportion of the stored charge from said sampling capacitor in order to control the ratio of the controlled output voltage to the voltage obtained from said sampling capacitor.

7. A voltage regulator control circuit as set forth in claim 5, wherein said capacitor network further includes at least one intermediate capacitor connected in said switching network; and said switching network being operable to connect said at least one intermediate capacitor to said sampling capacitor and to the control input port of said control signal generating means for removing a proportion of the stored charge from said sampling capacitor in order to control the ratio of the controlled output voltage to the voltage obtained from said sampling capacitor.

8. A voltage regulator control circuit as set forth in claim 1, wherein said control signal generating means includes a pulse generator connected to said switching network and to said controlled-voltage input port for providing drive pulses to said switching network and output pulses to said controlled-voltage input port for driving the output voltage regulating means of the voltage regulator.

9. A voltage regulator control circuit as set forth in claim 8, wherein said pulse generator comprises a pulse width modulator including a comparator and a logic AND gate having first and second inputs;

said comparator having first and second inputs respectively connected to said controlled-voltage input port and to said reference input port for comparing the input reference voltage and the controlled voltage and providing an output connected to a first input of said logic AND gate; and the second input of said logic AND gate being connected to said switching network controlling means.

10. A voltage regulator control circuit as set forth in claim 1, further including a switched capacitor filter network connected to said capacitor network;

an amplifier having first and second inputs respectively connected to said reference input port and to said switched capacitor filter network, said amplifier having an output connected to said control signal generating means; and a control loop connected to the output of said amplifier and to said switched capacitor filter network leading to the second input of said amplifier; and said switched capacitor filter network controlling the gain of the control loop.

11. A voltage regulator control circuit as set forth in claim 1, wherein said reference input port is adapted to be connected to an input voltage supply of the opposite polarity with respect to the output voltage provided by the voltage regulator which is to be controlled by the voltage regulator control circuit;

said control signal generating means thereby being operable from an input voltage supply of the opposite polarity when said control signal generating means is connected to said reference input port via controllable connections as provided by said switching network.

12. A multiple output voltage regulator control circuit system for controlling a plurality of output voltages from a voltage regulator having a plurality of respective output ports on which a plurality of controlled output voltages are provided, said multiple output voltage regulator control circuit system comprising:

a plurality of voltage regulator control circuits corresponding in number to the plurality of output ports of the voltage regulator on which the plurality of controlled voltage outputs respectively appear;

each of said plurality of voltage regulator control circuits including:

a controlled-voltage input port for receiving an output voltage from one of the output ports of the voltage regulator which is to be controlled by the corresponding voltage regulator control circuit, a reference input port for receiving an input reference voltage, a control signal generating means, a capacitor network including a plurality of capacitors, a switching network interposed between the capacitors of said capacitor network and each of said controlled-voltage input port, said reference input port and said control signal generating means and providing controllable connections among the capacitors of said capacitor network with said controlled-voltage input port, said reference input port, and said control signal generating mean, and means controlling the operation of said switching network to alter the controllable connections of said switching network in a repeating sequence, said control signal generating means being responsive to the repeating sequence of the controllable connections of said switching network to produce an output control signal which is a measure of the difference between the input reference voltage and the controlled voltage received by the particular controlled-voltage input port of a respective voltage regulator control circuit.

* * * * *